(12) United States Patent
Purgatorio

(10) Patent No.: US 8,956,674 B2
(45) Date of Patent: *Feb. 17, 2015

(54) FOOD HOLDING DEVICE, METHOD OF MAKING, AND METHOD OF STORING COOKED FOOD

(71) Applicant: Restaurant Technology, Inc., Oak Brook, IL (US)

(72) Inventor: James C. Purgatorio, Woodridge, IL (US)

(73) Assignee: Restaurant Technology, Inc., Oak Brook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/148,087

(22) Filed: Jan. 6, 2014

(65) Prior Publication Data

US 2014/0193549 A1 Jul. 10, 2014

Related U.S. Application Data

(60) Continuation of application No. 13/974,186, filed on Aug. 23, 2013, now abandoned, which is a division of application No. 12/661,059, filed on Mar. 10, 2010, now Pat. No. 8,518,201.

(51) Int. Cl.
| | |
|---|---|
| *B65D 81/34* | (2006.01) |
| *B21D 31/06* | (2006.01) |
| *A23L 1/01* | (2006.01) |
| *A47J 39/00* | (2006.01) |
| *C21D 7/06* | (2006.01) |
| *B24C 1/10* | (2006.01) |

(52) U.S. Cl.
CPC .............. *B21D 31/06* (2013.01); *A23L 1/0128* (2013.01); *A47J 39/006* (2013.01); *C21D 7/06* (2013.01); *B65D 81/34* (2013.01); *B24C 1/10* (2013.01)
USPC ........................................... 426/394; 493/52

(58) Field of Classification Search
CPC ....................................................... B65D 81/34
USPC ........................................... 426/394; 493/52
See application file for complete search history.

(56) References Cited

U.S. PATENT DOCUMENTS

| | | | |
|---|---|---|---|
| 4,481,405 | A | 11/1984 | Malick |
| 4,533,576 | A | 8/1985 | Tanahashi et al. |
| 4,942,046 | A | 7/1990 | Scott |
| 5,389,767 | A | 2/1995 | Dobry |

(Continued)

FOREIGN PATENT DOCUMENTS

| | | |
|---|---|---|
| WO | WO2005/056841 | 6/2005 |
| WO | WO2005/068667 | 7/2005 |
| WO | WO2005/092163 | 10/2005 |
| WO | WO2008/155538 | 12/2008 |

OTHER PUBLICATIONS

EHEDG, "Hygienic Equipment Design Criteria" EHEDG Guidelines, Doc 8, Apr. 2004, p. 12 [online] retrieved from URL=<www.ehedg.org/uploads/DOC_08_E_2004.pdf>.

(Continued)

*Primary Examiner* — Michael C Miggins
(74) *Attorney, Agent, or Firm* — Hinshaw & Culbertson LLP

(57) ABSTRACT

A food holding device includes a holding bin and an optional heating component. The holding bin has a specified average surface roughness Ra on at least a portion of the surface intended to be contacted with food during storage of the food.

21 Claims, 3 Drawing Sheets

(56) References Cited

U.S. PATENT DOCUMENTS

| | | |
|---|---|---|
| 5,676,870 A | 10/1997 | Wassman et al. |
| 6,031,208 A | 2/2000 | Witt et al. |
| 6,294,769 B1 | 9/2001 | McCarter |
| 6,360,423 B1 | 3/2002 | Groll |
| 6,589,370 B1 | 7/2003 | Dubois et al. |
| 6,818,242 B2 | 11/2004 | Mitsuiki et al. |
| 7,488,515 B2 | 2/2009 | Groll |
| 2002/0092842 A1 | 7/2002 | Loveless |
| 2008/0023462 A1 | 1/2008 | Shei |
| 2009/0045185 A1 | 2/2009 | Schroeder |

OTHER PUBLICATIONS

International Searching Authority, International Search Report and Written Opinion, International Application No. PCT/US2011/00306, May 26, 2011.

FOOD HOLDING DEVICE, METHOD OF MAKING, AND METHOD OF STORING COOKED FOOD

CROSS-REFERENCE TO RELATED APPLICATIONS

This application is a continuation of U.S. patent application Ser. No. 13/974,186, filed on Aug. 23, 2013, which is a divisional of U.S. patent application Ser. No. 12/661,059, filed on Mar. 10, 2010, now U.S. Pat. No. 8,518,501, issued Aug. 27, 2013. The entire disclosures of the foregoing applications are hereby expressly incorporated by reference.

FIELD OF THE INVENTION

The present invention relates generally to a food holding device and more particularly to a food holding device with an improved surface finish that facilitates storing and maintaining food at an appropriate elevated temperature.

BACKGROUND OF THE INVENTION

In many restaurants, some food is prepared prior to serving and needs to be stored prior to serving while maintaining the temperature of the cooked food. It is advantageous to be able to maintain a steady and uniform temperature of the cooked food. This is especially the case with certain types of cooked food, such as French fries, for example. Typically, French fries and similar types of foods are cooked by frying a suitable portion amount in heated cooking oil in a fry basket. After cooking, the cooking oil is allowed to drain from the French fries and typically the French fries are then stored in a holding bin until a quantity of French fries is required to fill a customer's order. Typically, the French fries are stored in a heated holding bin made of stainless steel and heated by a heat lamp. The radiant energy from the heat lamp is absorbed by the French fries contained in the holding bin. However, a holding bin that has a standard stainless steel food appliance surface of the holding bin adjacent French fries is relatively cool in the presence of heat lamp radiation, which is not optimum for storage of French fries as some of the stored French fries will contact the relatively cool stainless steel surface and others will not, resulting in a temperature disparity. This effect can be more pronounced as French fries are removed from the bin to fill orders and portions of the bottom surface of the bin are exposed, particularly as to single-layer or individual French fries that are exposed to or in contact with such bin surfaces. A need exists for a heated French fry storage bin having an optimal surface for maintaining French fries in a uniform heated state during storage including as French fries are periodically removed and added to the bin, alternately exposing more and less of the holding bin surface.

SUMMARY OF THE INVENTION

One embodiment of the present invention comprises a food holding device including a holding bin and optionally a heating component. Cooked food items can be stored in the holding bin of the food holding device. While it is contemplated that typically the food contained in the holding bin will be heated by a heating component, such as an infrared heat lamp, for example, the heating component does not need to form part of the food holding device in accordance with the invention.

In accordance with the invention, a surface or surfaces of the holding bin intended for contact by the food stored therein will have a surface roughness as hereinafter described. It is to be understood that other surfaces of the food holding device may also have such surface roughness if desired.

In one embodiment, at least a portion of the food contacting exposed surfaces of the holding bin have an average surface roughness Ra in the range of from about 0.5 µm to about 3 µm and more particularly from about 0.75 µm to about 2 µm and more preferably in the range of from about 0.75 to about 1.75 µm. For example, for any embodiment of the invention, the average surface roughness may be up to a maximum of about 1.2 µm. As used herein, the term surface roughness is a measure of the texture of a surface, quantified by the vertical deviations of a real surface from a perfectly uniform surface. As used herein, "average surface roughness Ra" and "surface roughness Ra" means the roughness of a surface that is the absolute value arithmetic average surface roughness of a surface.

In another embodiment, the bottom portion of the holding bin comprises perforations and an average surface roughness Ra in the range of from about 1.0 µm to about 1.75 µm. The desired surface roughness Ra can be obtained by any suitable method including, for example, by abrading, polishing or by bead blasting, as will be known to those skilled in the art and depending on the condition of the starting surface.

If present, the heating component of the food holding device provides heat to approximately maintain the temperature of cooked food stored in the food holding device. In one embodiment, the heating component comprises a radiant heat source, typically being at least one infrared heat lamp. The heat lamp may comprise at least one frosted bulb.

In a specific embodiment, the bottom portion can be heated to an average elevated temperature typically in the range of from about 165° F. to about 175° F. The bottom portion may have cooked food stored thereon. The cooked food may maintain an approximately uniform temperature. In one embodiment, the cooked food is any fried food, such as, for example, French fries or chicken nuggets.

In another embodiment of the invention, a method of storing cooked food is provided. In one embodiment, cooked food is placed in a food holding device comprising a bin portion and a heating component, wherein the bottom portion comprises an average surface roughness Ra in the range of from about 0.5 µm to about 3 µm and more particularly from about 0.75 µm to about 2 µm. In another embodiment, the bottom portion comprises an average surface roughness Ra in the range of from about 1.0 µm to about 1.75 µm. In another embodiment, the surface roughness Ra of the bottom portion is obtained by bead blasting. Preferably, the stored cooked food maintains an approximately uniform temperature. During use, a thin film of cooking oil is formed on the roughened surface, enabling further absorption of the radiant energy from the heat lamp(s).

In a further embodiment, a method of making a food holding device comprises providing a sheet of material suitable for a holding bin, at least a portion of the sheet of material having an average surface roughness Ra in the range of from about 0.5 µm to about 3 µm; forming a food holding bin having a food contacting surface from the sheet of material so that at least a portion of the food contacting surface has the specified average surface roughness of about 0.5 µm to about 3 µm and more particularly in the range of from about 0.75 µm to about 2 µm. In another embodiment, the bottom portion is bead blasted to an average surface roughness Ra in the range of from about 1.0 µm to about 1.75 µm. For example, for any embodiment of the invention, the average surface roughness may be up to a maximum of about 1.2 µm. The bead blasting may comprise subjecting the bottom portion to a stream of round glass beads having an average grit size of 6 to 80 (about 5 to 70 USS mesh (USS means United States Standard Sieve screen size)) at a sufficient pressure to provide the desired surface roughness of the particular material being treated. Any suitable blasting media can be used as long as the desired surface roughness is achieved.

In a specific embodiment, the heating component comprises a radiant heat source, which may be at least one heat lamp. Typical heat sources are infrared heat lamps. In another embodiment, the bottom portion is perforated and comprises at least two trays, and the heating component comprises four heat lamps, the heat lamps comprising frosted bulbs.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION

Figure 1:
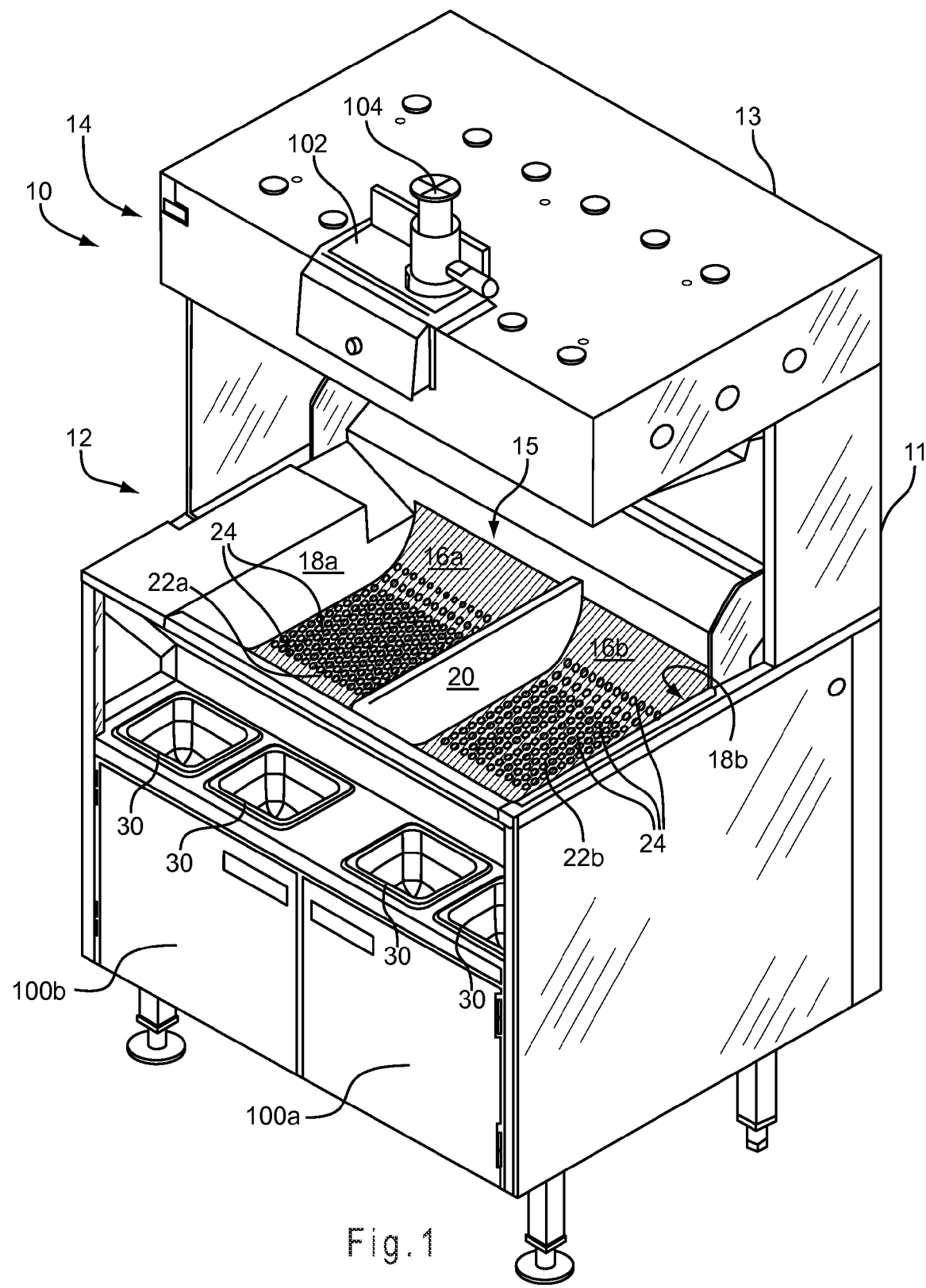
FIG. 1 illustrates a perspective view of a food holding device of the present invention.
Figure 2:
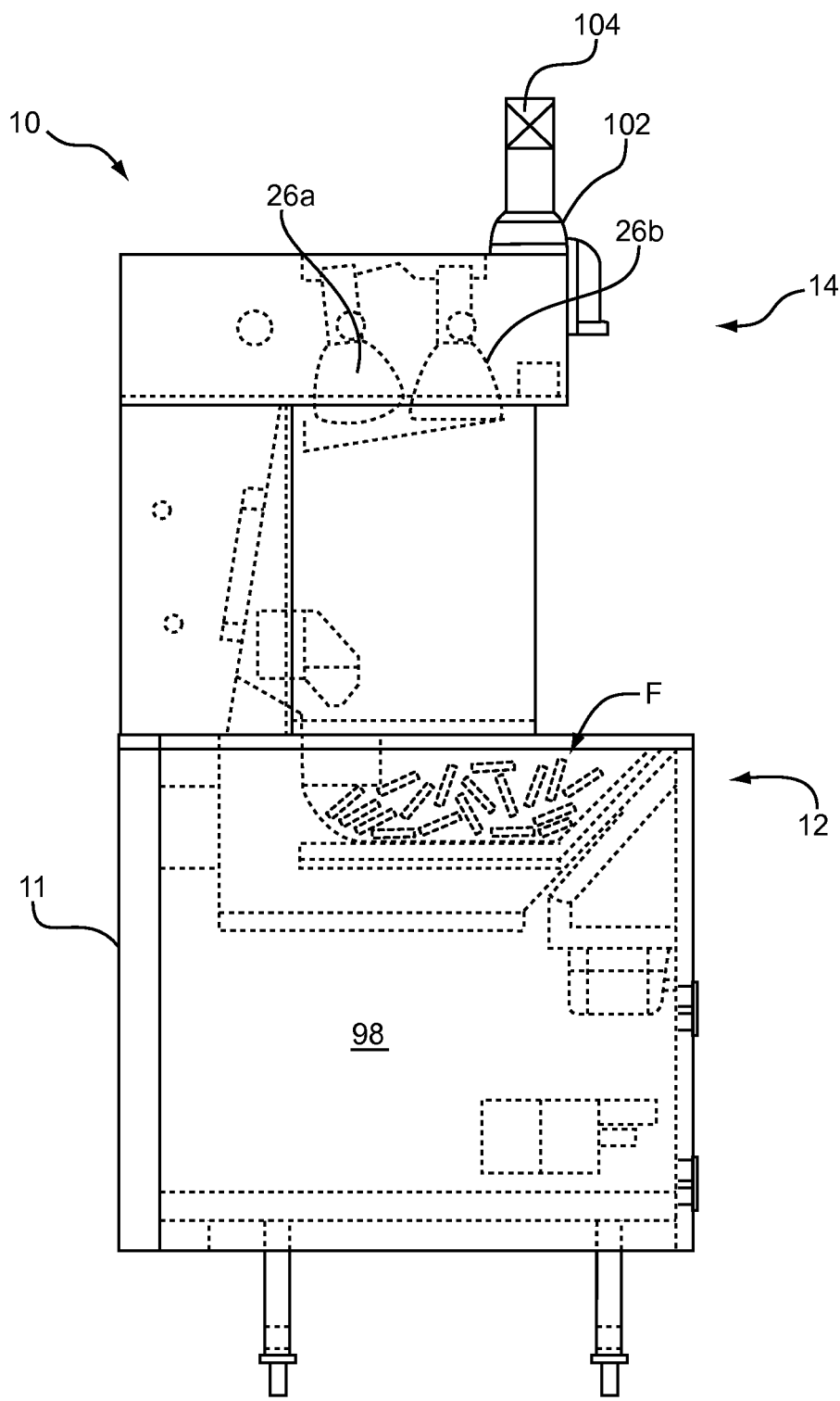
FIG. 2 illustrates a side elevation view of a food holding device of the present invention.

FIGS. 1 and 2 illustrate a typical food holding device 10 in accordance with the invention. Food holding device 10 as illustrated is especially suited for holding cooked food such as French fries and chicken nuggets, for example. Food holding device 10 includes a food holding portion 12 and a heating component 14 housed in a cabinet 11. Food holding portion 12 includes holding bin 15 composed of a tray 16a-b, sidewalls 18a-b, a bin divider 20, and a bottom surface 22a-b of tray 16a-b.

Tray 16a-b may contain perforations 24 as desired. Perforations 24 allow oil and/or any liquid to drip from and small solid food particles to be separated from any food stored within food holding device 10, thereby helping to maintain the crispness and uniform quality of the food. Typically, perforations are circular and are from about 0.1 inches to about 0.5 inches in diameter, although it is to be understood that any suitably shaped and sized perforations may be used, which can be related to the size and type of food to be stored therein, as will be appreciated by those skilled in the art.

Food holding portion 12 includes the at least one tray 16a-b and can include bin divider 20. Food holding portion 12 does not always include a bin divider 20 or may include multiple tray dividers to form additional compartments in food holding portion 12. Food holding portion 12 as illustrated includes an optional one bin divider 20. This provides two holding areas for food items.

Food holding portion 12 can comprise any appropriate material that will absorb heat, such as anodized aluminum or stainless steel. Typically, the bottom portion comprises stainless steel.

Heating component 14 comprises a heating element to heat food holding portion 12. The heating element may be any appropriate heating element. In one embodiment, the heating element comprises heat lamps 26a-b. The heating element may comprise at least one heat lamp and may comprise as many heat lamps 26a-b as desired to obtain a desired appropriate temperature of food holding portion 12. Heat lamps 26a-b may comprise any type of bulb, such as clear lamps or frosted lamps. In one embodiment, heat lamps 26a-b each comprises a frosted infrared heat lamp.

Tray 16a-b, including bottom surface 22a-b comprises an average surface roughness Ra in the range of from about 0.5 µm to about 3 µm and more typically from about 0.75 µm to about 2 µm. In another embodiment, the bottom surface comprises an average surface roughness Ra in the range of from about 1.0 µm to about 1.75 µm. For example, for any embodiment of the invention, the average surface roughness may be up to a maximum of about 1.2 µm. Any appropriate method may be utilized to obtain the desired average surface roughness. For example, bottom surface 22a-b may be polished or bead blasted to obtain the desired average surface roughness. Typically, bottom surface 22a-b is bead blasted to obtain an average surface roughness Ra of between approximately 0.75 µm and approximately 2 µm. The surface roughness Ra can be measured with a profilemeter as is known in the art. Typically, at least the portion of holding bin 15 that contacts food, is intended to contact food or typically contacts food during use, will have the surface roughness Ra as described herein.

Bottom surface 22a-b absorbs heat from heat lamps 26a-b. The average surface roughness Ra is in the range of from about 0.5 µm to about 3 µm and more particularly from about 0.75 µm to about 2 µm typically results in a bottom surface that is on average 11° F. hotter than a standard polished tray for a typical heating lamp arrangement used to maintain cooked French fries at elevated temperature just prior to serving them to a customer. Bottom surface 22a-b absorbs heat such that when cooked food F is added to food holding portion 12, cooked food F does not lose a significant amount of heat to bottom surface 22a-b. Cooked food F maintains a more uniform temperature throughout the cooked food stored in food holding portion 12, resulting in overall hotter cooked food. The exposed surfaces of sidewalls 18a-b and bin divider 20 may, if desired, also have a surface roughness Ra similar to that of bottom surface 22a-b, as illustrated with respect to the sidewalls shown in FIG. 3.

Cooked food F is contained within food holding portion 12. Cooked food F as illustrated is French fries and can be any cooked food desired to be stored in food holding device 10, such as French fries, hash browns, onion rings, fried mushrooms, hamburgers, chicken, or any other food item. In one embodiment, cooked food F is French fries. Cooked food F is maintained at an approximately uniform temperature throughout, and does not lose a significant amount of heat to bottom surface 22a-b.

Figure 3:
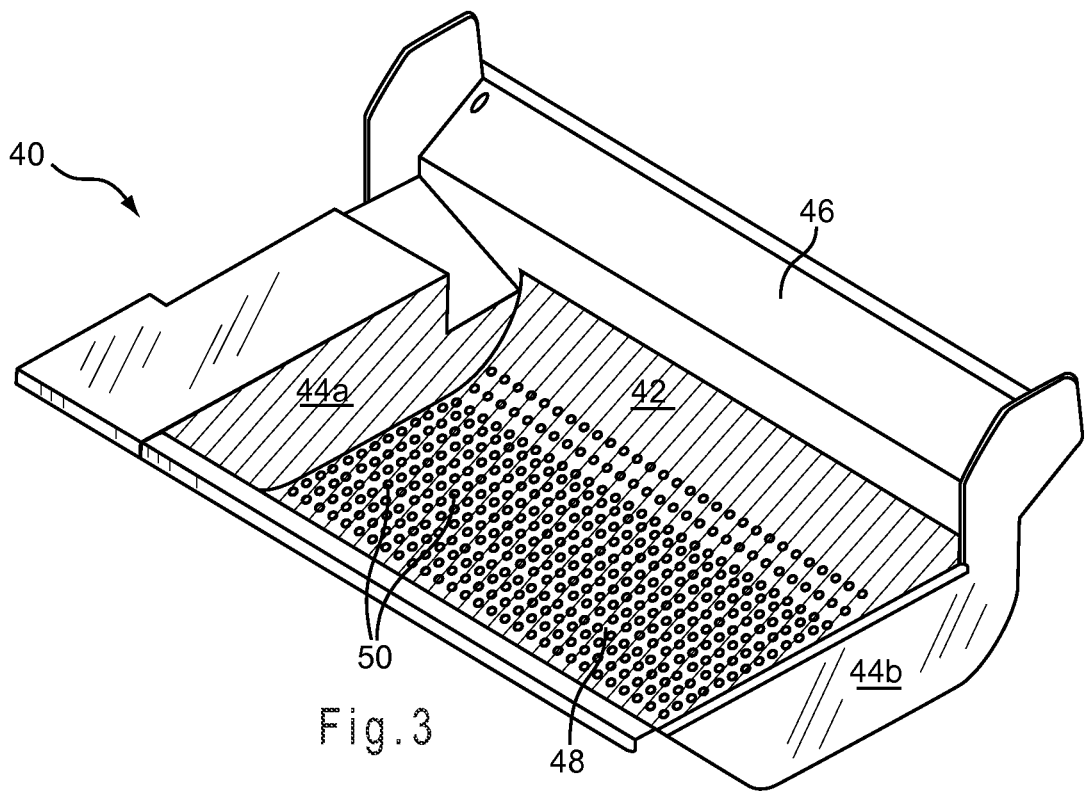
FIG. 3 illustrates a perspective view of a bottom portion of a food holding device of the present invention.

FIG. 3 illustrates a bottom portion 40 of a food holding device in accordance with another embodiment of the invention. Bottom portion 40 includes a tray 42, at least two sidewalls 44a-b, a back portion 46, and a bottom surface 48.

Bottom surface 48 typically comprises perforations 50. Perforations 50 allow small particulate matter, oil and/or any liquid to drip from any food stored within bottom portion 40, thereby helping to maintain the crispness and consistency of the food. Typically, perforations are circular and are typically in the range of 0.1 to about 0.5 inches in diameter, although it is to be understood that any suitably shaped and sized perforations may be used, which can be related to the size and type of food to be stored therein, as will be appreciated by those skilled in the art.

Bottom portion 40 can comprise any appropriate material for contact with food that will absorb heat, such as anodized aluminum or stainless steel. Preferably, the bottom portion comprises stainless steel.

Tray 42, including bottom surface 48, comprises an average surface roughness Ra in the range of from about 0.5 μm to about 3 μm and more particularly from about 0.75 μm to about 2 μm. In a more particular embodiment, bottom surface 48 comprises an average surface roughness Ra in the range of from about 1.0 μm to about 1.75 μm. For example, for any embodiment of the invention, the average surface roughness may be up to a maximum of about 1.2 μm. Any appropriate method may be utilized to obtain the desired average surface roughness. For example, bottom surface 48 may be polished or bead blasted to obtain the desired average surface roughness. Typically, the bottom surface is bead blasted to obtain an average surface roughness Ra in the desired range. Optionally, and as shown in FIG. 3, sidewalls 44*a* and 44*b* have a surface roughness Ra similar to the surface roughness of bottom surface 48.

Bottom surface 48 can absorb heat. The average surface roughness Ra of between approximately 0.75 μm and approximately 2 μm results in a bottom surface that is on average 11° F. hotter than a standard polished tray during normal use (i.e., after bottom surface 48 has a coating of cooking oil thereon after typical use in storing French fries or other fried food). Bottom surface 48 absorbs heat such that when cooked food is added to bottom portion 40, the cooked food does not lose a significant amount of heat to bottom surface 48. The cooked food maintains a more uniform temperature throughout the cooked food stored in bottom portion 40, resulting in overall hotter cooked food.

Typically, back portion 46 does not undergo the same treatment as bottom surface 48. Back portion 46 can be untreated anodized aluminum or stainless steel. Typically, back portion 46 is standard polished stainless steel.

Figure 4:
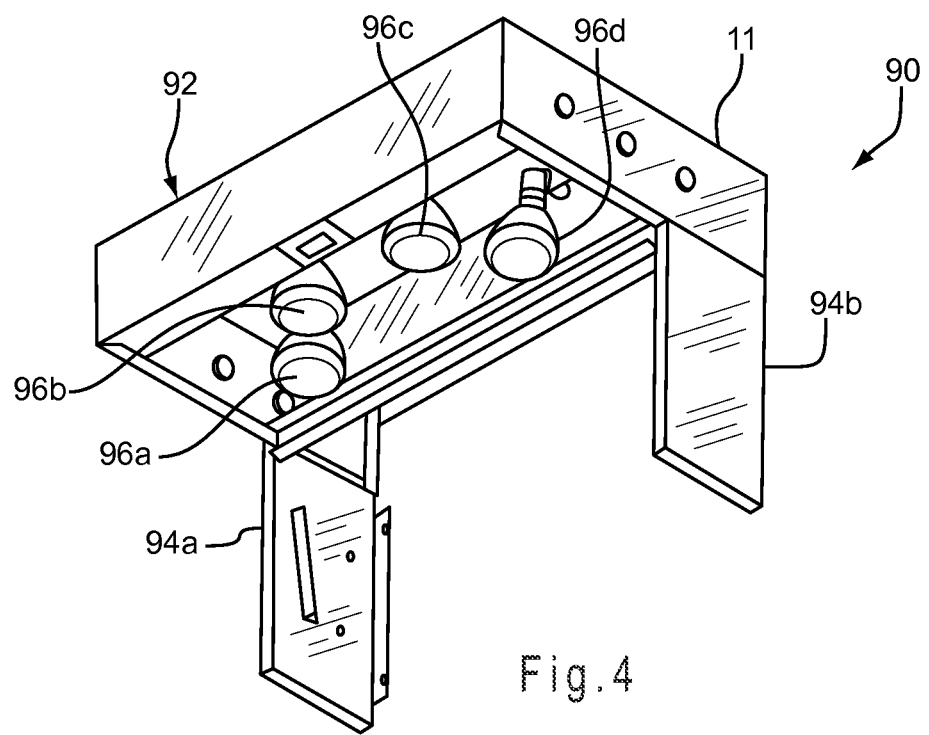
FIG. 4 illustrates a perspective view of a heating component of a food holding device of the present invention.

FIG. 4 illustrates a heating component 90 of a food holding device in accordance with another embodiment of the invention. Heating component 90 includes a top portion 92 and two side portions 94*a-b*. Top portion 92 comprises heat lamps 96*a-d*. Heat lamps 96*a-d* provide heat that can be used to maintain the temperature of cooked food. Heat lamps 96*a-d* can be either clear glass or frosted bulbs. Typically, heat lamps 96*a-d* are frosted bulbs.

In another aspect of the invention, a method of storing cooked food is provided. The method of storing cooked food includes placing cooked food in a food holding device. The food holding device includes a bottom portion and a heating component. Typically, the food holding device is the food holding device as illustrated in FIGS. 1-4.

Returning to FIGS. 1 and 2, cooked food F is placed into food holding device 10. Typically, cooked food F is placed into tray 16*a-b*. Heat lamps 26*a-b* heat bottom surface 22*a-b*. A storage area 13 is provided along the top of cabinet 11.

Bottom surface 22*a-b* absorbs heat such that when cooked food F is added to food holding portion 12, cooked food F does not lose a significant amount of heat to bottom surface 22*a-b*. Cooked food F maintains a more uniform temperature throughout the cooked food stored in food holding portion 12, resulting in overall hotter cooked food.

Bottom surface 22*a-b* contains perforations 24. Oil and liquid drip from any food stored within food holding device 10 through perforations 24, thereby maintaining the crispness of the food.

In another aspect of the invention, a method of making a food holding device is provided. The method of preparing a food holding device includes optionally providing a heating component, providing a perforated bottom portion comprising a bottom surface and at least one tray, forming a desired surface roughness, which may be by bead blasting the bottom surface, to achieve an average surface roughness Ra in the range of from about 0.5 μm to about 3 μm and more particularly from about 0.75 μm to about 2 μm. In some embodiments, the bottom surface is bead blasted to achieve an average surface roughness Ra in the range of from about 1.0 μm to about 1.75 μm.

Returning to FIGS. 1 and 2, the bead blasting includes subjecting the bottom surface 22*a-b* to a stream of glass beads at a suitable pressure and for a suitable time to achieve the desired surface roughness. As will be appreciated by those skilled in the art, the pressure and duration will depend on many factors, including the type of material being bead blasted, the nozzle type and rate of bead bombardment.

In one embodiment, as illustrated in FIGS. 1 and 2, heating component 14 includes at least one heat lamp 26*a-b*. In another embodiment, as illustrated in FIGS. 1 and 2, food holding portion 12 includes at least two trays 16*a-b*. In a further embodiment illustrated in FIG. 4, heating component 90 may contain four heat lamps 96*a-d*, wherein heat lamps 96*a-d* include frosted bulbs.

Cabinet 11 may include a storage area 98 covered by doors 100*a*, 100*b*. Cabinet 11 may also include receptacles 30 which can be used for storage of items, for example, for holding French fry cartons to be filled or other articles as desired. A cabinet storage area 102 is provided along the top of cabinet 11, which can be used to hold a salt dispenser 104 as shown in FIG. 1.

EXAMPLES

Example 1

A frystation was tested for heat distribution along the bottom surface of the bottom portion. The frystation had a width of 36 inches, and was a non-autosalt frystation. The top portion had four 375 W GE® frosted, non-coated heating lamps with an R40 base. The bottom portion had multiple perforations and was bead blasted with glass beads to an average surface roughness Ra of about 0.75 μm. Surface temperatures of the bottom portion were taken at twelve different points; four equally spaced points along a back row, four equally spaced points along a middle row, and four equally spaced points along a front row. The temperatures were in a 19° F. temperature range, between 153° F. and 182° F., with an average value of 169° F. The data is summarized below in Table 1.

TABLE 1

Frystation with a Bottom Surface with an Average Surface Roughness Ra of about 0.75 μm

| | Surface Temperature (° F.) | | | |
|---|---|---|---|---|
| Back Row | 157 | 153 | 170 | 169 |
| Middle Row | 163 | 164 | 182 | 181 |
| Front Row | 180 | 167 | 180 | 179 |

Comparative Example

A control frystation was tested for heat distribution along the bottom surface of the bottom portion. The frystation had a width of 36 inches. The top portion had four 375 W Franke® clear, non-coated heating lamps with an R40 base. The bottom portion had multiple perforations and was a polished tray surface. Surface temperatures of the bottom portion were taken at twelve different points; four equally spaced points along a back row, four equally spaced points along a middle row, and four equally spaced points along a front row. The temperatures were in a 30° F. temperature range, between 138° F. and 168° F., with an average value of 158° F. The data is summarized below in Table 2.

TABLE 2

Frystation with a Polished Bottom Surface

| | Surface Temperature (° F.) | | | |
|---|---|---|---|---|
| Back Row | 168 | 165 | 163 | 156 |
| Middle Row | 161 | 168 | 164 | 166 |
| Front Row | 138 | 145 | 144 | 156 |

While the invention has been described with respect to certain preferred embodiments, as will be appreciated by those skilled in the art, it is to be understood that the invention is capable of numerous changes, modifications and rearrangements, and such changes, modifications and rearrangements are intended to be covered by the following claims.

The invention claimed is:

1. A method of storing cooked food in a food holding bin, comprising:
   placing cooked food in a food holding bin having a food-contacting surface, at least a portion of the food-contacting surface having an average surface roughness Ra in the range of from about 0.5 µm to about 3 µm;
   directing radiant energy onto the food while in the holding bin and onto at least a portion of the surface of the food holding bin having the average surface roughness Ra.

2. The method of claim 1 further comprising forming a thin film of cooking oil on the surface having the roughness.

3. The method of claim 1 wherein placing cooked food in the food holding bin comprises placing French fries or chicken nuggets in the food holding bin.

4. The method of claim 1 wherein the food is selected from the group consisting of French fries, chicken nuggets, hash browns, onion rings, fried mushrooms, hamburgers, chicken and mixtures thereof.

5. The method of storing cooked food of claim 1, wherein the average surface roughness Ra is in the range of from about 0.75 µm to about 2 µm.

6. The method of storing cooked food of claim 5, wherein the average surface roughness Ra is in the range of from about 0.75 µm to about 1.75 µm.

7. The method of claim 1 wherein at least a portion of the food-contacting surface comprises a bottom surface of the food holding bin.

8. The method of claim 7, wherein the bottom surface comprises a plurality of openings, the method further comprising separating the placed food from oil by allowing the oil to drip through the openings.

9. The method of claim 7 wherein the bottom surface has an average surface roughness Ra between the perforations of between approximately 0.75 µm and approximately 2 µm.

10. The method of claim 7 further comprising heating the bottom surface to an average temperature in the range of from about 165° F. to about 175° F. by the radiant energy.

11. A method of making a food holding device comprising:
    providing a sheet of material suitable for a holding bin, at least a portion of the sheet of material having an average surface roughness Ra in the range of from about 0.5 µm to about 3 µm;
    forming at least a portion of a food holding bin from the sheet of material having a food-contacting surface wherein at least a portion of the food-contacting surface has the average surface roughness Ra.

12. The method of claim 11 wherein the material of the food holding bin is stainless steel.

13. The method of claim 11, wherein all of the food-contacting surface of the holding bin has an average surface roughness Ra in the range of from about 0.5 µm to about 3 µm.

14. The method of claim 11, wherein at least substantially all of the food-contacting surface of the holding bin has an average surface roughness Ra in the range of from about 0.5 µm to about 3 µm.

15. The method of claim 11 further comprising bead blasting the sheet of material to provide the average surface roughness Ra.

16. The method of claim 15, wherein the bead blasting comprises bead blasting with glass beads.

17. The method of claim 15 wherein the bead blasting comprises bead blasting with glass beads having an average grit size of 6 to 80.

18. The method of claim 11, wherein the average surface roughness Ra is in the range of from about 0.75 µm to about 2 µm.

19. The method of claim 18, wherein the average surface roughness Ra is up to a maximum of about 1.2 µm.

20. A method of storing cooked French fries comprising:
    placing cooked French fries in a food holding bin having a food-contacting surface, at least a portion of the food-contacting surface having an average surface roughness Ra in the range of from about 0.5 µm to about 3 µm;
    directing radiant energy onto the cooked French fries while in the holding bin and onto at least a portion of the surface of the food holding bin having the average surface roughness Ra.

21. A method of making a food holding bin from a sheet of material comprising:
    bead blasting at least a portion of a sheet of material to provide a surface roughness Ra in the range of from about 0.5 µm to about 3 µm; and
    forming at least a portion of a food-contacting surface of the food holding bin from the sheet of material wherein the portion of the food-contacting surface having the surface roughness Ra.

* * * * *